Figures 1, 2:
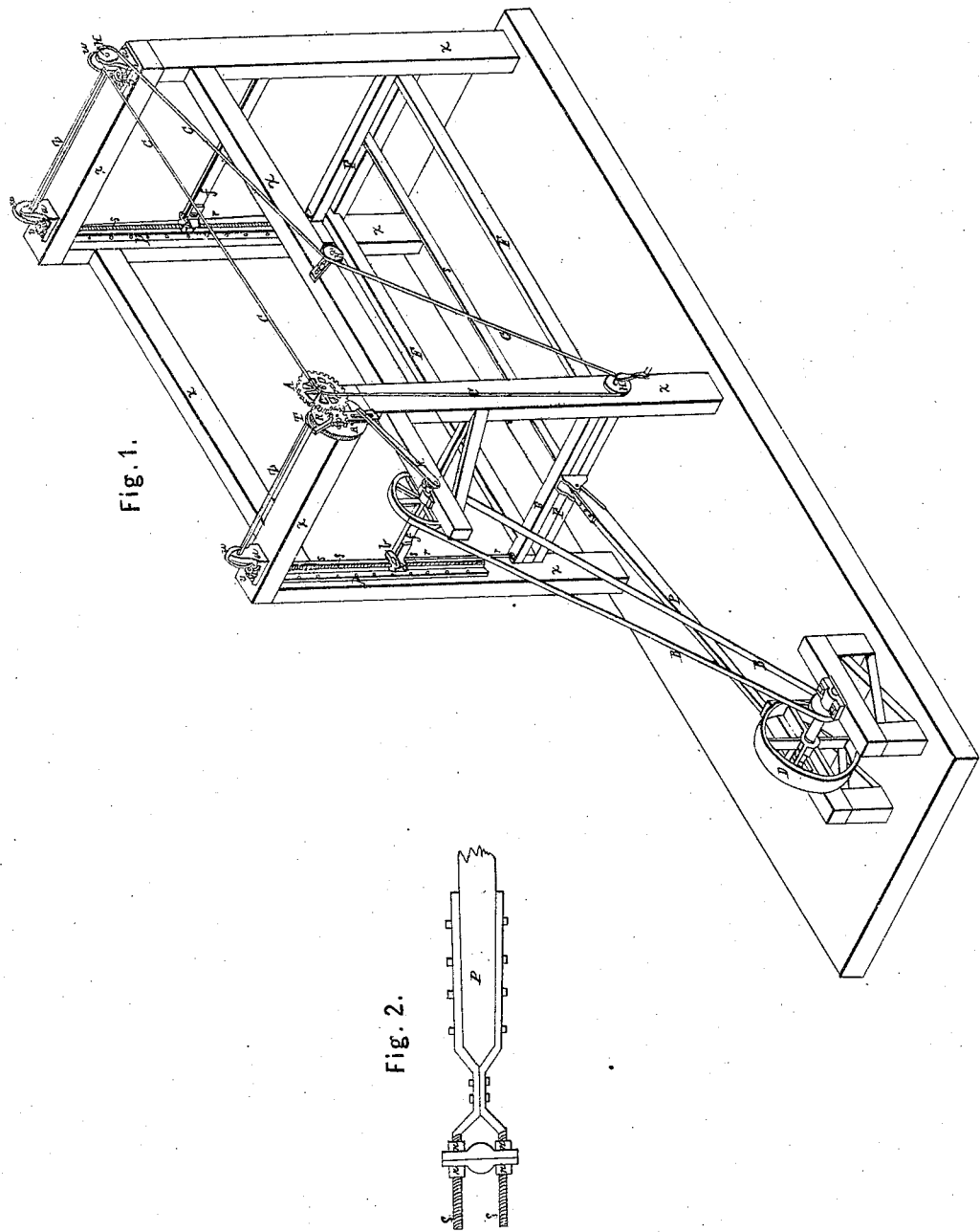

A. T. Merriman.
Stone Sawing Mach.
N° 24.478. Patented June 21, 1859.

Witnesses.
M. Poole
J. R. Negus

Inventor.
Andrews T. Merriman.

UNITED STATES PATENT OFFICE.

A. T. MERRIMAN, OF CHICAGO, ILLINOIS.

MACHINE FOR SAWING STONE.

Specification of Letters Patent No. 24,478, dated June 21, 1859.

*To all whom it may concern:*

Be it known that I, ANDREWS T. MERRIMAN, of Chicago, in the county of Cook and State of Illinois, have invented a new and useful Improvement on Machines for Sawing Stone; and I hereby declare that the following is a full, clear, and exact description of the construction and operation of the same, reference being had to the annexed drawing, making a part of this specification, in which—

Figure one (1) is a perspective view and Fig. two (2) a side view of the connecting rod or adjustable pitman.

In Fig. one (1) the letter $x$ show the frame work of the machine as ordinarily constructed; F, F, the frame in which the saws are placed; S, the saw; P, the pitman connecting the saw frame with the crank on the shaft of the driving pulley marked D.

On top of the principal frame and near each corner is secured a cast iron chain marked $a$, supporting the iron shafts Z, Z, on each end of which is a beveled cog wheel W, W, working into other bevel wheels V, V, which are attached to the long screws $s, s$, which pass down through the cap of the main frame and through the cross heads on the arms of the cross bars $f, f$.

$p, p$, are cast iron guides firmly bolted to the inside of each of the posts of the main frame in which the ends of the cross bars $f, f$, move up or down.

$r, r$ are iron rods connecting each corner of the saw frame with hinge joints to the heads on each end of the arms $f, f$, which are supported on the screws $s, s$, in such a manner as to prevent any jumping motion of the saw frame.

B, B, is a band from the main shaft to another to which is attached the connecting rod $k$, one end of which is attached to a rock shaft, in which there is a slot for the purpose of increasing or diminishing the movement of the pawl T, which is attached to the other end of the rock shaft. The pawl T working on the toothed wheel R, R, which is on the same shaft with pinion O, gives motion to the toothed wheel marked A, which is on one of the shafts $z$. On each of said shafts is a small wheel marked H, a similar one on the side of the frame which serves as a tightening pulley and one at the foot of one of the posts to which is attached a hand crank. These several wheels are connected by an endless chain the movement of which gives the same motion to the shafts $z\ z$ and the gearing connected therewith.

In Fig. two (2) is a representation of the end of the pitman which connects with the driving shaft. By moving the nuts $n, n$, on the screws $s, s$, the length of the pitman is increased or diminished, by which means the movement of the saws may be made the same when the frame is elevated very much above the center of the driving shaft.

The operation of the machine is as follows: By increasing the length of the pitman to correspond with the elevation of the saw frame above the center of motion the action of the saw is the same as when working on the level of the center. By connecting each corner of the saw frame with the cross heads on each end of the bars $f, f$, by means of iron rods or other stiff connections which are raised or lowered by means of screws instead of chains or ropes as in the usual way the motion of the saw may be very greatly accelerated without producing any rocking or jumping motion, and consequently a much larger amount of work performed in a given time with the same power.

I do not claim the machine in ordinary use for sawing stone as my invention.

What I claim as my invention and desire to secure by Letters Patent is—

The lowering the saw frame by means of the long screws $s, s$, acting on the sliding bars $f, f$, and the stiff connecting rods $r, r$, hung with hinge joints at the saw frame and the sliding bars $f\ f$ (instead of chains or rope) for the purpose of holding the saw frame steady and prevent any jumping motion, all in the manner described.

ANDREWS T. MERRIMAN.

Witnesses:
HORACE M. SINGER,
MANNING S. POOLE.